(12) United States Patent
Ito

(10) Patent No.: US 6,367,997 B2
(45) Date of Patent: Apr. 9, 2002

(54) PRINT OUTPUT METHOD AND PRINTER SYSTEM

(75) Inventor: Tomohiko Ito, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 0 days.

(21) Appl. No.: 09/729,722

(22) Filed: Dec. 6, 2000

(30) Foreign Application Priority Data

Dec. 7, 1999 (JP) .......................................... 11-347401

(51) Int. Cl.[7] .................................................. B41J 5/30
(52) U.S. Cl. .......................... 400/582; 400/76; 400/70; 400/61
(58) Field of Search ........................... 400/582, 76, 70, 400/61

(56) References Cited

U.S. PATENT DOCUMENTS 5,625,757 A * 4/1997 Kageyama et al. ......... 395/113

FOREIGN PATENT DOCUMENTS

JP 408095726 A * 4/1996

* cited by examiner

Primary Examiner—John S. Hilten
Assistant Examiner—Charles H. Nolan, Jr.
(74) Attorney, Agent, or Firm—Sughrue Mion, PLLC

(57) ABSTRACT

In a printer system comprising a plurality of printers, a printer in an output-impossible state can specify and confirm a backup printer. Each of the printers comprises display means, data storage means, printer information obtaining means, backup printer determining means, and data transfer means. One of the printers in output-impossible state stores output data in the data storage means and displays an error-state display in a status display unit thereof. The printer obtains information of the other printers via the printer information obtaining means. The backup printer determining means of the printer determines a backup printer based on a predetermined condition and displays which is the backup printer on the backup printer display unit thereof. At the same time, the printer reads the output data from the data storage means and transfers the data to the backup printer via the data transfer means.

11 Claims, 5 Drawing Sheets

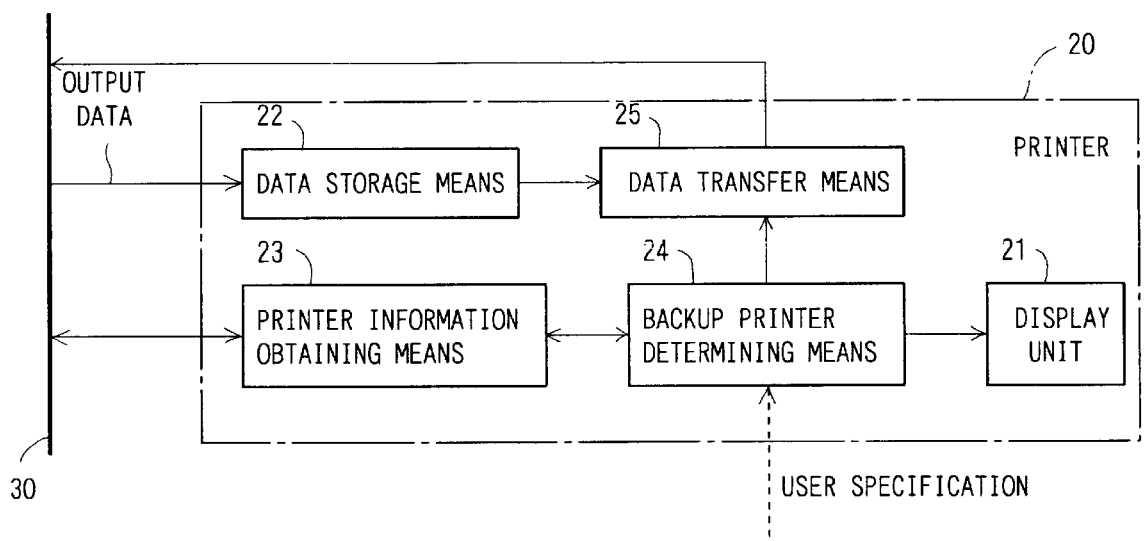
F I G. 5

PRINT OUTPUT METHOD AND PRINTER SYSTEM

BACKGROUND OF THE PRESENT INVENTION

1. Field of the Invention

The present invention relates to a printer system connecting a plurality of printers and to a method of determining a backup printer in the printer system.

2. Description of the Related Art

Printer systems each connecting a plurality of printers are in use. In such a printer system, when one of the printers cannot output a print due to hardware failure, paper jam, or toner shortage (hereinafter this situation is called output-impossible state), so-called backup printing by switching to another printer (hereinafter called a backup printer) is carried out in some cases. There are methods of determining which printer carries out backup printing. For example, in an automatic backup printing method, a backup printer is selected according to a predetermined manner in the case where a printing command to an output-impossible printer is issued, and data are automatically transferred to this backup printer. In another method, a user determines a backup printer each time and re-issues an output command.

In the two methods described above, the former automatic backup printing is superior to the latter method utilizing user instruction, in terms of user convenience.

However, in the conventional automatic backup printing, information about which printer carries out backup printing is displayed only on a console (such as a personal computer) issuing a print output command, not on the printer that has been in an output-impossible state. Therefore, when a user tries to obtain his/her print at a location of the output-impossible printer to which the print output command has been issued, only error-state display or toner shortage display or the like notifies the user of the output-impossible state of the printer, and which printer carries out backup printing is not notified to the user. The user has to check the console in order to confirm the backup printer.

In the conventional method by user instruction, information about which backup printer is available is not displayed on the output-impossible printer but only on the console that has issued the print output command. Therefore, in order to specify a backup printer, the user has to reach the console and re-issues the output command therefrom.

SUMMARY OF THE INVENTION

The present invention has been conceived based on consideration of the above problems. An object of the present invention is therefore to provide a method of confirming a backup printer by using an output-impossible printer and to provide a printer system for carrying out the method.

Another object of the present invention is to provide a method of enabling an output-impossible printer to determine which printer carries out backup printing, and to provide a printer system for carrying out the method.

When a printer to which an output command has been issued is in an output-impossible state, a print output method of the present invention determines a backup printer from printers in the output-ready state and displays information of which backup printer carries out backup printing on the output-impossible printer.

In other words, the print output method of the present invention is a method used in a printer system connecting a plurality of printers, and used in the case where one of the printers receiving an output command is in an output-impossible state. The print output method comprises the steps of:

determining a backup printer from printers in output-ready state in the system;

transferring output data to the backup printer; and outputting a print based on the transferred data by using the backup printer; while displaying which of the printers is the backup printer on the output-impossible printer (the printer that has originally received the output command).

In the print output method of the present invention, it is preferable for the output-impossible printer to determine the backup printer.

In this case, it is preferable for the output-impossible printer to obtain information regarding the other printers so that the output-impossible printer can determine the backup printer based on the information. In the case where an apparatus other than the output-impossible printer determines the backup printer, it is also preferable for the apparatus to obtain the information regarding the other printers so that the apparatus can determine the backup printer based on the information.

As the "information regarding the other printers", printer setting, busy or idle state, a paper size, a state of a consumable article (such as toner), a state of load (such as paper jam) and the like can be used. "Output prohibited" stateet for an individual printer may be included in the information. The printer set to the output-prohibited state is excluded from being a candidate of backup printer.

In the case where the information regarding the other printers has been obtained, it is preferable for the information to be displayed on the output-impossible printer. The information to be displayed is not necessarily all the information regarding the other printers that has been obtained. Alternatively, instead of the information itself, other kinds of information based on the information regarding the other printers, such as information as to whether each of the other printers can be a candidate of the backup printer, may be displayed.

In the case where the output-impossible printer determines the backup printer, if a backup-printer specification (specification by a user) is input, it is preferable for the backup printer to be determined based on the specification. The phrase stating "based on specification" refers to inclusion of the specification in judging criteria for backup printer determination, and does not necessarily refer to output from the printer that has been specified by the user.

A printer system of the present invention is a system for carrying out the print output method described above. In other words, the printer system of the present invention connects a plurality of printers, and the system comprises:

backup printer determining means for determining, in the case where one of the printers that has received an output command is in an output-impossible state, a backup printer from printers in output-ready state in the system; and data transfer means for transferring output data to the backup printer. In the printer system, each of the plurality of printers comprises:

display means for displaying which of the printers is the backup printer.

In the printer system of the present invention, each of the printers may not necessarily have the backup printer determining means and the data transfer means. However, it is preferable for each of the printers to have the backup printer determining means and the data transfer means.

In the case where each of the printers has the backup printer determining means and the data transfer means, it is preferable for each of the printers to comprise printer information obtaining means for obtaining information regarding the printers other than itself. In this case, it is also preferable for the backup printer determining means to determine the backup printer based on the information. Furthermore, in this case, it is also preferable for each of the printers to comprise second display means for displaying the information regarding the other printers. Moreover, in the case where a user inputs backup-printer specification, it is preferable for the backup printer determining means to determine the backup printer based on the specification.

According to the print output method and the printer system of the present invention, when the printer receiving the output command is in an output-impossible state, the output-impossible printer displays which printer is the backup printer. Therefore, it becomes unnecessary to confirm which printer is the backup printer at a console that has issued the output command. In this manner, the system enables a user to easily find his/her print.

If the output-impossible printer that has originally received the output command determines the backup printer, print output is necessarily carried out even in the case where the console that has issued the output command cannot determine the backup printer. In this case, if the information regarding the other printers is obtained and the backup printer is determined based on the information, a suitable printer can be determined as the backup printer.

If the printers have the data transfer means, the printer that has originally received the output command can transfer the output data to the backup printer.

If the information regarding the other printers is obtained and displayed on the output-impossible printer, the user can specify the backup printer while referring to the information displayed on the output-impossible printer, without going back to the console.

BRIEF DESCRIPTION OF THE DRAWINGS

FIG. 5 is a block diagram showing a printer for carrying out a second print output method;

DESCRIPTION OF THE PREFERRED EMBODIMENT

Hereinafter, an embodiment of the present invention will be explained with reference to the accompanying drawings.

Figure 1:
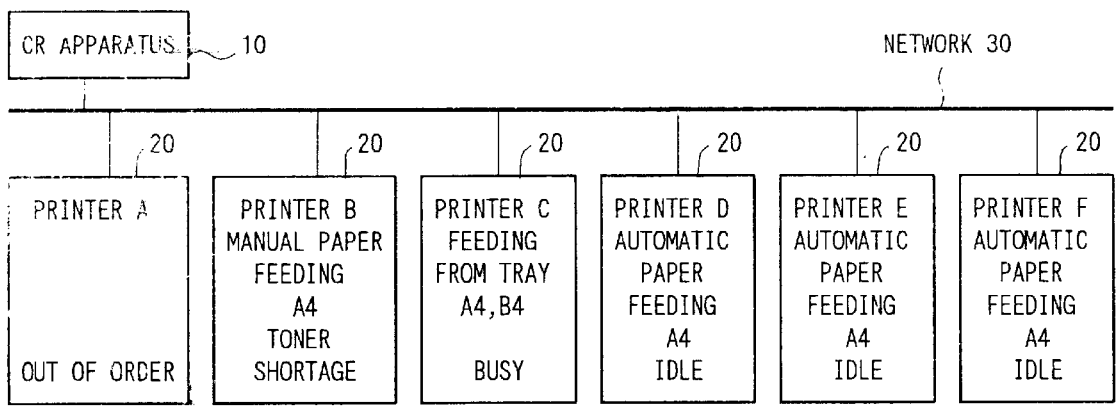
FIG. 1 a block diagram showing an embodiment of a printer system for carrying out a print output method of the present invention.

FIG. 1 is a block diagram showing an embodiment of a printer system for carrying out a print output method of the present invention.

As shown in FIG. 1, the printer system comprises a CR (Computed Radiography) apparatus 10 and printers 20 shown by A, B, . . . , and F. The apparatus 10 and the printers 20 are connected to each other via a network 30.

Figure 2:
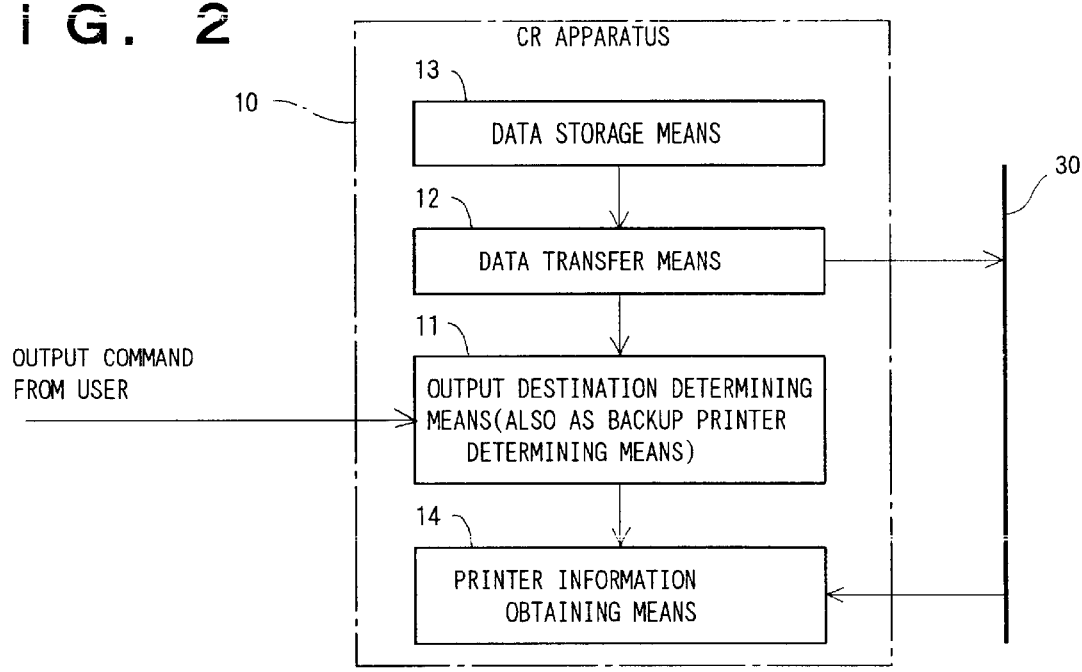
FIG. 2 is a block diagram showing a CR apparatus.

The CR apparatus 10 comprises output destination determining means 11 which also serves as backup printer determining means of the present invention, data transfer means 12, data storage means 13, and printer information obtaining means 14, as shown in FIG. 2.

Figure 3:
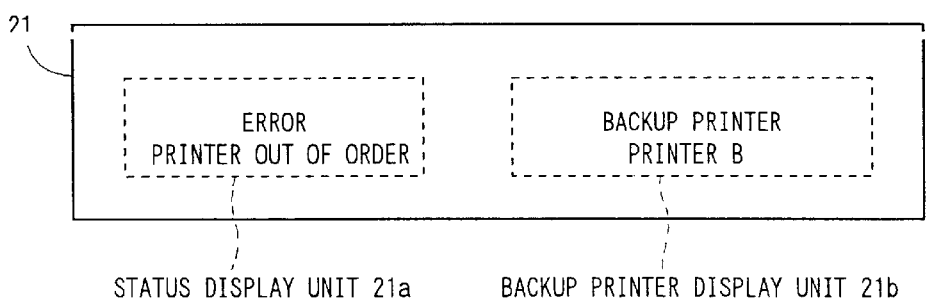
FIG. 3 is a block diagram showing a display unit of a printer.

Each of the printers 20 has a display unit 21 comprising a status display unit 21a and backup printer display unit 21b as first display means of the present invention, as shown in FIG. 3.

Each of the printers 20 is in state shown in FIG. 1. In other words, the printer A is out of order due to a hardware problem although A4-size paper is loaded therein. The printer B has been set to enable manual feeding of A4-size paper, but has run out of toner. The printer C has been set to enable feeding of A4- and B4-size paper from trays, and printing is being carried out (in a busy state). The printers D and E have been set to enable automatic feeding of A4-size paper, and are in an idle state (in stand-by state). The printer F has been set to enable automatic feeding of A4-size paper and is also in an idle state.

Figure 4:
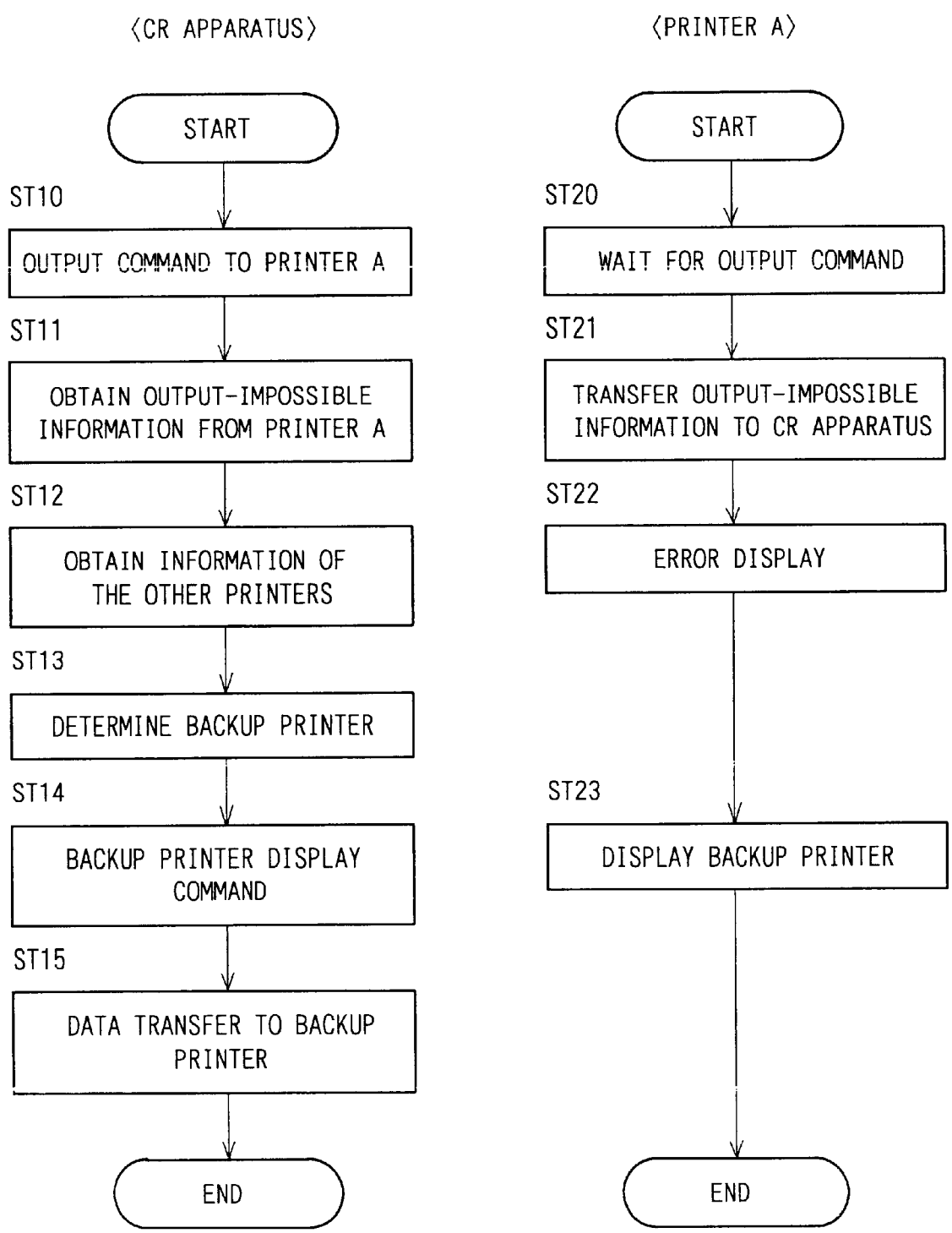
FIG. 4 is a flow chart showing a first print output method in the printer system.

A first print output method of the present invention in the printer system having the above configuration will be explained next with reference to a flow chart in FIG. 4. In FIG. 4 (and also in FIGS. 6 and 7), ST refers to a stepnumber.

Image data obtained by the CR apparatus 10 are temporarily stored in the data storage means 13. All the printers 20 are waiting for a command unless an output command has been issued thereto (ST 20).

When a user issues an output command to one of the printers 20 (the printer A, for example; hereinafter called designated printer A) (ST 10), the output destination determining means 11 of the CR apparatus 10 sends information of up-coming transfer of output data to the designated printer A via the printer information obtaining means 14 before transferring output data to the designated printer A according to the output command. At the same time, the output destination determining means 11 waits for status information from the designated printer A.

The designated printer A that has received the information of output-data transfer transmits to the output destination determining means 11 the status information, that is, information as to whether or not the printer A is in output-ready state, via the printer information obtaining means 14. More specifically, since the designated printer A is in an output-impossible state due to the hardware problem, the printer A sends output-impossible information as the status information (ST 21), and displays an error-state display indicating the failure in the status display unit 21a thereof (ST 22).

The output destination determining means 11 that has received the output-impossible information (ST11) requests transmission of status information from all the printers 20 excluding the designated printer A, and obtains information of all the other printers 20 via the printer information obtaining means 14 (ST 12). As the information of all the other printers 20, printer setting, busy or idle state, a paper size, a state of a consumable article (such as toner), a state of load (such as paper jam) and the like are preferably included (which is the same in second and third methods that will be explained later). In this manner, the output destination determining means 11 understands output-impossible state of the printers B and C in addition to the designated printer A and output-ready state of the printers D, E, and F.

The output destination determining means 11 selects a backup printer which carries out backup printing from the printers 20 in output-ready state (D, E, F), according to a predetermined condition (ST 13). As the predetermined condition, priority is preferably determined in advance. In this case, the priority is assumed to have been set in the order of the printer A, B, . . . , and F. The output destination determining means 11 therefore determines the printer D as the backup printer. The output destination determining means 11 issues a display command to the printer A to cause the printer A to display "printer D" indicating the backup printer (ST 14) and reads output data from the data storage means 13 to transfer the output data to the printer D via the data transfer means 12 (ST 15). The printer A receives the display command and displays the printer D as the backup printer in the backup printer display unit 21b thereof (ST 23). The printer D that has received the output data carries out printing based on the transferred output data.

In the above embodiment, the CR apparatus 10 has the output destination determining means 11 and the printer information obtaining mean 14 so that the CR apparatus 10 can determine the backup printer. However, a dedicated apparatus comprising the output destination determining means 11 and the printer information obtaining means 14 may be used separately from the CR apparatus 10.

A second print output method by using a printer system having the same configuration as in the above system will be explained next.

In the first print output method described above, the backup printer is determined by the CR apparatus 10. In the second method, a designated printer A in output-impossible state determines a backup printer, which is different from the first method.

A CR apparatus 10 comprising the printer system for carrying out the second print output method does not need to have the output destination determining means 11 and the printer information obtaining means 14 shown in FIG. 2. However, each of the printers 20 comprises, in addition to a display unit 21, data storage means 22 for storing data from the CR apparatus 10, printer information obtaining means 23 for obtaining information regarding all the other printers 20 in order to monitor the status thereof, backup printer determining means 24 for determining a backup printer in the case of output-impossible state, and data transfer means 25 for transferring output data to the backup printer after reading the output data from the data storage means 22.

The second print output method will be explained next with reference to a flow chart shown in FIG. 6.

Image data obtained by the CR apparatus 10 are temporarily stored in the data storage means 13 thereof. All the printers 20 are waiting for a command unless an output command has been issued thereto (ST 40).

When a user inputs an output instruction to the designated printer A (ST 30), the CR apparatus 10 reads the output data from the data storage means 13 and transfers the output data to the printer A via the data transfer means 12 (ST 31).

The designated printer A that has received the output data transferred from the CR apparatus 10 is in output-impossible state due to a hardware problem as has been described above. Therefore, the printer A temporarily stores the output data in the data storage means 22 thereof (ST 41) and displays an error-state display indicating the failure on the status display unit 21a thereof (ST 42).

The designated printer A requests transmission of status information from all the other printers 20, and obtains the information regarding the other printers 20 via the printer information obtaining means 23 (ST 43). In this manner, the backup printer determining means 24 understands output-impossible state of the printers B and C and output-ready state of the printers D, E and F.

The backup printer determining means 24 selects the backup printer from the printers 20 in output ready state (D, E and F) based on a predetermined condition. As the predetermined condition, priority is preferably determined in advance. The priority is assumed to have been set in the order of printer A, B, . . . , and F. The printer D is assumed to have been set to prohibit output regardless of the printer D being ready or not ready. In this case, the backup printer determining means 24 determines the printer E as the backup printer. The backup printer determining means displays "printer E" as the backup printer on the backup printer display unit 21b (ST 45), and reads the output data from the data storage means 22 to transfer the data to the printer E (to the backup printer) via the data transfer means 25 (ST 46). The printer E that has received the data carries out printing based on the transferred data.

A third print output method in a printer system having the same configuration as in the above system will be explained next.

In the second print output method, the backup printer is determined automatically by the designated printer A in output-impossible state based on the predetermined condition. In the third method, a user can specify a backup printer, which is different from the second method.

A CR apparatus 10 and printers 20 for carrying out the third method have the same configuration as those used in the second method, except for backup printer determining means 24 of each of the printers 20 which can receive a backup-printer specification by a user, as shown by a dashed line in FIG. 5. Each of the printers 20 can be set to either an automatic backup mode or a manual determination mode by user specification as methods of determining the backup printer. A backup printer display unit 21b of each of the printers 20 also serves as second display means in the present invention.

Figure 7:
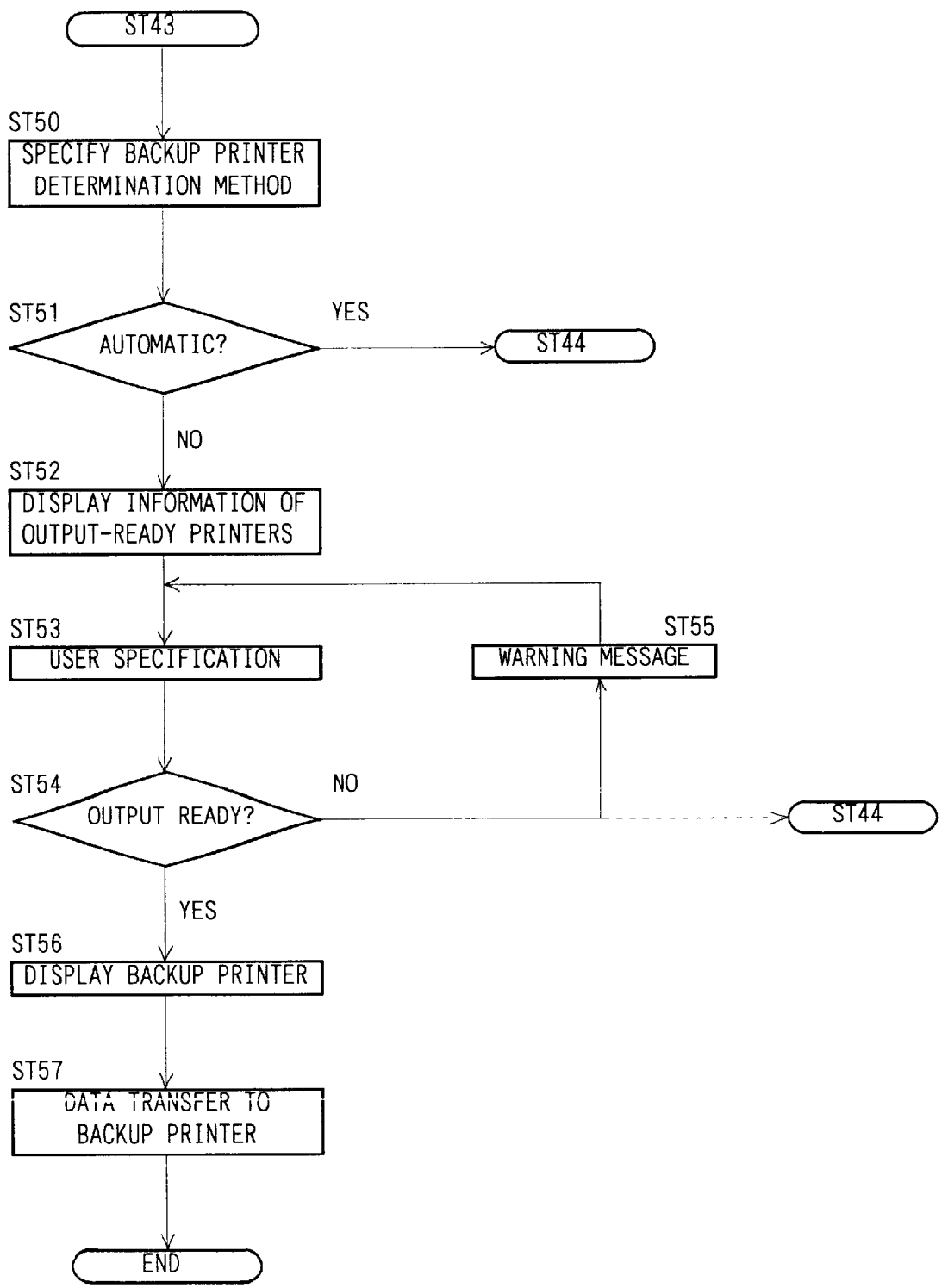
FIG. 7 is a flow chart showing a third print output method in a printer system.

The third print output method will be explained with reference to a flow chart shown in FIG. 7.

Figure 6:
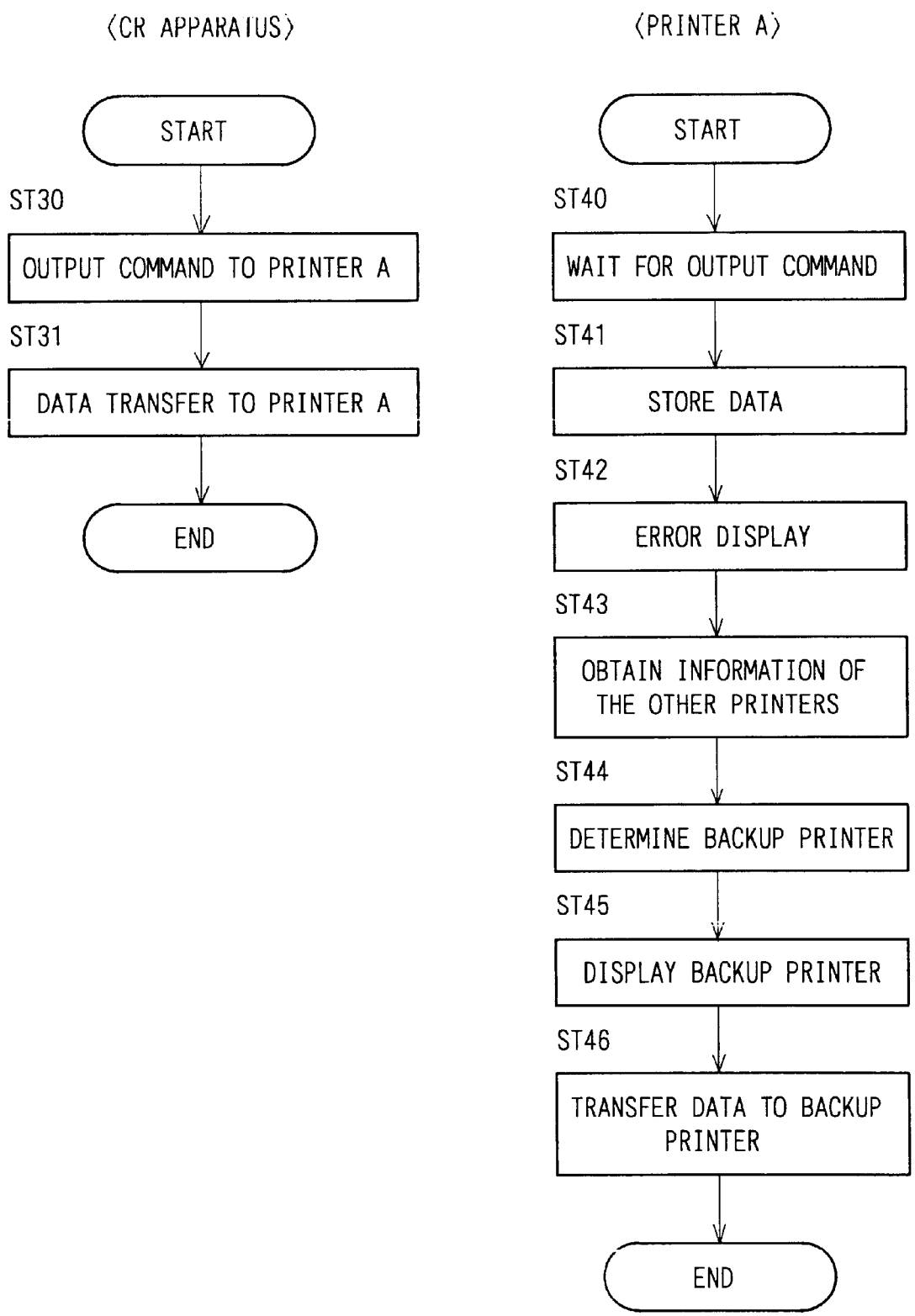
FIG. 6 is a flow chart showing the second print output method in a printer system.

Processing in the CR apparatus 10, and processing to ST 43 in a designated printer A is the same as in the second method shown in FIG. 6.

In the designated printer A, which of the modes is set as the backup printer determining method is judged after ST 43 (ST 50). If the automatic mode has been set (ST51-YES), the procedure goes to ST 44 and the same processing as in the second method is carried out.

If the manual determination mode has been set (ST 51-NO), which of the printers 20 is in an output-ready state is judged based on information regarding all the other printers obtained by the designated printer A, and the printer A shows the printers in output-ready state as candidates of the backup printer in the backup printer display unit 21b thereof (ST 52). The printer A then waits for the user specification. As in the above example, information of printers D, E and F being in output-ready state is displayed. It is needless to say that information of the printers E and F being in output-ready state is displayed in the case where the printer D has been set to prohibit output.

When the user inputs the backup-printer specification (ST 53), whether or not the specification is the same as one of the candidates of the backup printer displayed on the backup printer display unit 21b, that is, whether or not the specification indicates one of the printers in output ready state, is judged (ST 54). When one of the printers in an output-impossible state has been specified (ST 54-NO), a warning (a message or a sound) is issued (ST 55) and the procedure goes back to ST 53 to wait for an adequate input. As shown by a dashed line in the right of ST 54 in FIG. 7, when the user has specified one of the output-impossible printers, the procedure may go back to ST 44 so that the mode is changed to the automatic mode by invalidating the user specification. Thereafter the processing as in the second method is carried out in this case.

If the printer that has been specified is in an output ready state (ST 54-YES), the backup printer determining means 24 determines the printer as the backup printer (the printer F is assumed to have been specified by the user here), and output data are read from the data storage means 22 to be transferred to the printer F (the backup printer) via the data transfer means 25 (ST 57). The printer F that has received the output data carries out printing based on the transferred output data.

Since the backup printer is determined based on the user specification, the user recognizes which printer is the backup printer without seeing display indicating the backup printer. However, for confirmation, "printer F" may be displayed on the backup printer display unit 21*b* as the backup printer, as shown by a dashed line between ST 54 and ST 57 in FIG. 7 (ST 56).

Although the preferred embodiment of the present invention has been explained, the present invention is not limited to the embodiment.

For example, in the second and third methods, the output data are transferred from the CR apparatus 10 to the designated printer A and stored in the data storage means 22. At the same time, the backup printer is determined by the designated printer A and the output data read from the data storage means 22 are transferred to the backup printer. However, without transferring the output data from the CR apparatus 10 to the designated printer A, the printer A may notify the CR apparatus 10 of the backup printer after determining the backup printer so that the output data are directly transferred from the CR apparatus 10 to the backup printer.

In addition, all of the contents of Japanese Patent Application No. 11(1999)-347401 are incorporated into this specification by reference.

What is claimed is:

1. A print output method used in a printer system connecting a plurality of printers in the case where one of the printers receiving an output command is in an output-impossible state, the print output method comprising the steps of:
    determining a backup printer from printers in output-ready state in the system;
    transferring output data to the backup printer; and
    outputting a print based on the transferred data by using the backup printer; while
    displaying which of the printers is the backup printer on the printer in the output-impossible state.

2. A print output method as defined in claim 1, wherein the printer in the output-impossible state determines the backup printer.

3. A print output method as defined in claim 2, wherein the step of determining the backup printer further comprises the steps of:
    obtaining information regarding printers in the system other than the printer in the output-impossible state; and
    determining the backup printer based on the information.

4. A print output method as defined in claim 3, further comprising the step of displaying the information regarding the other printers on the printer in output-impossible state.

5. A print output method as defined in any one of claims 2 to 4, wherein, in the case where a backup printer specification is input, the backup printer is determined based on the specification.

6. A printer system connecting a plurality of printers, the printer system comprising:
    backup printer determining means for determining, in the case where one of the printers that has received an output command is in an output-impossible state, a backup printer from printers in output-ready state in the system; and
    data transfer means for transferring output data to the backup printer, and each of the plurality of printers comprising:
        first display means for displaying which of the printers is the backup printer.

7. A printer system as defined in claim 6, wherein each of the printers comprises the backup printer determining means.

8. A printer system as defined in claim 7, wherein each of the printers further comprises the data transfer means.

9. A printer system as defined in claim 7 or 8, wherein each of the printers comprises printer information obtaining means for obtaining information regarding the other printers and the backup printer determining means determines the backup printer based on the information.

10. A printer system as defined in claim 9, wherein each of the printers comprises second display means for displaying the information regarding the other printers that has been obtained.

11. A printer system as defined in any one of claims 7, 8 and 10, wherein the backup printer determining means determines, in the case where a backup printer specification is input, the backup printer based on the specification.

* * * * *